(12) United States Patent
Cazanas et al.

(10) Patent No.: US 9,007,174 B2
(45) Date of Patent: Apr. 14, 2015

(54) SERVICE IDENTIFICATION AUTHENTICATION

(75) Inventors: Carlos A. Cazanas, Bethlehem, PA (US); Victor M. Pagan, Breinigsville, PA (US); Jamal N. Khan, Princeton, NJ (US); Eric Brown, Edison, NJ (US); Terence J. Sullivan, Pequannock, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 85 days.

(21) Appl. No.: 13/569,009

(22) Filed: Aug. 7, 2012

(65) Prior Publication Data

US 2014/0043141 A1 Feb. 13, 2014

(51) Int. Cl.
| | | |
|---|---|---|
| *G05B 19/00* | (2006.01) | |
| *G05B 23/00* | (2006.01) | |
| *G06F 7/00* | (2006.01) | |
| *G06F 7/04* | (2006.01) | |
| *G08B 29/00* | (2006.01) | |
| *G08C 19/00* | (2006.01) | |
| *G06F 21/33* | (2013.01) | |
| *H04L 29/06* | (2006.01) | |
| *H04W 12/06* | (2009.01) | |
| *G07C 9/00* | (2006.01) | |

(52) U.S. Cl.
CPC .......... *G06F 21/335* (2013.01); *G07C 9/00031* (2013.01); *G07C 9/00103* (2013.01); *H04L 63/08* (2013.01); *H04W 12/06* (2013.01)

(58) Field of Classification Search
CPC . G06F 21/36; G06Q 10/063112; G06Q 20/40
USPC ....................................................... 340/5.81
See application file for complete search history.

(56) References Cited

U.S. PATENT DOCUMENTS

| | | | |
|---|---|---|---|
| 4,236,068 A * | 11/1980 | Walton | 235/380 |
| 6,838,992 B2 | 1/2005 | Tenarvitz | |
| 7,724,207 B2 | 5/2010 | Mooney et al. | |
| 7,962,369 B2 | 6/2011 | Rosenberg | |
| 2002/0169636 A1* | 11/2002 | Eggers et al. | 705/3 |
| 2005/0066179 A1* | 3/2005 | Seidlein | 713/182 |
| 2005/0171787 A1* | 8/2005 | Zagami | 705/1 |
| 2005/0229005 A1 | 10/2005 | Le Saint et al. | |
| 2008/0223921 A1* | 9/2008 | Salazar et al. | 235/380 |
| 2009/0284347 A1* | 11/2009 | Zimmerman | 340/5.81 |
| 2010/0052852 A1* | 3/2010 | Mohanty | 340/5.83 |
| 2012/0100824 A1* | 4/2012 | Michael | 455/404.2 |
| 2012/0303404 A1* | 11/2012 | Nudd | 705/7.15 |
| 2013/0231077 A1* | 9/2013 | Cahill | 455/404.2 |

* cited by examiner

*Primary Examiner* — George Bugg
*Assistant Examiner* — Anthony D Afrifa-Kyei (57) ABSTRACT

A server receives a service personnel identification verification request from a computing device. The request includes identification information obtained via the computing device from a security badge. The computer determines whether there is a security concern with the identification information by comparing the identification information to stored service personnel information in a service personnel database. A response is sent to the computing device indicating the result of the determination, for presentation to a user who may be interacting with a person having the security badge.

16 Claims, 7 Drawing Sheets

FIG. 4

SERVICE IDENTIFICATION AUTHENTICATION

BACKGROUND

When service personnel, such as police, delivery people, or technicians, interact with enterprise clients, it is often very difficult for a client to determine whether the service person is who he or she purports to be. Traditionally, badges and/or identification (ID) cards are used, each of which may include a logo, a badge number, name, picture, and the like to provide a modicum of authenticity to the client. While such identification is useful, it is subject to problems. For example, when an unmarked vehicle with flashing lights stops another vehicle and a driver is later presented with a badge or an ID card, there is no way of knowing whether the individual behind the badge is truly a police officer. Indeed, a lost or stolen security badge could easily be altered to include an alternate picture. Similarly, badges or ID cards could be forged to resemble their authentic counterparts.

Even if some of the identity information is stored electronically in the security badge as a security token, an individual confronted with such a security badge typically does not have a way to read the information and/or to authenticate the information in the security token.

Hence, a need exists for systems and methods to electronically read a security token associated with a security badge and to verify that the person behind the badge is who he or she purports to be.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to authentication of identity information stored on or inside a security badge. The term "security badge" refers to a physical identification device that may take various forms, such as a badge, card, fob or the like, as configured or used for identifying the holder of the badge or card to another person. Examples of security badges include police badges, personal identification cards, as well as smart card implementations thereof. Security badges may or may not include electronic security tokens and/or machine readable tokens (e.g. in the form of barcodes). In some examples the security badge may be a handheld computing device with a graphical user interface with wireless communication capability.

The term "personnel" as described herein refers to any one or more individuals that purport or appear to represent an entity. Typical examples include police officers or other security or governmental officials, delivery people, utility persons, and technicians.

A computing device receives identity information from a security badge and sends some or all of the received identity information over a network to an authentication server. Based on the received information, the authentication server determines whether the badge is valid or there is some security concern with regard to the information from the badge. A response is sent through the communication interface to the computing device, thereby authenticating the personnel or indicating a security concern.

Figure 1:
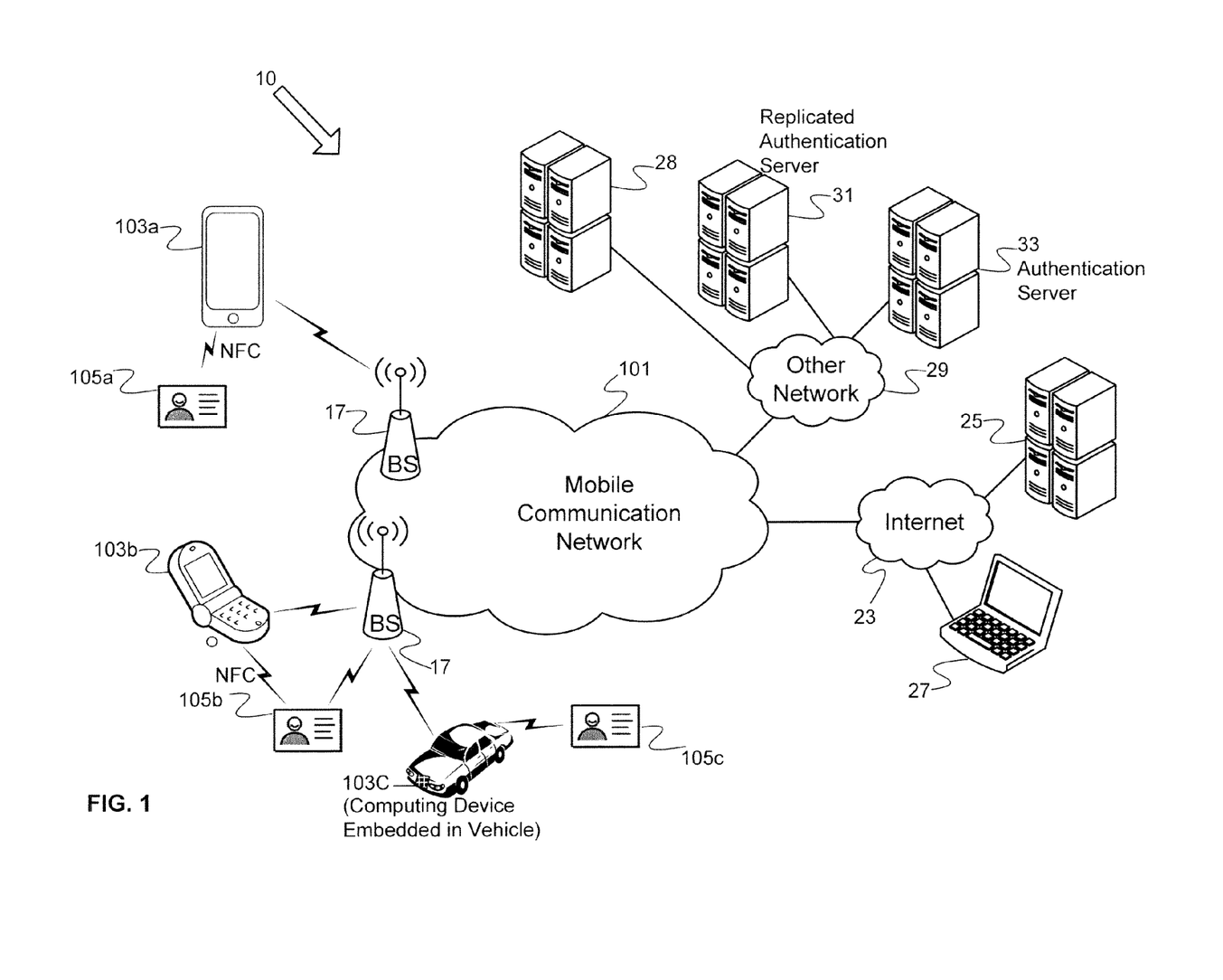
FIG. 1 illustrates a system offering an exemplary framework to provide personnel authentication.

Reference now is made in detail to the examples illustrated in the accompanying drawings and discussed below. FIG. 1 illustrates a system 10 offering a framework to provide personnel authentication, in accordance with certain aspects of the present disclosure. The example shows several computing devices 103a and 103b, several security badges (105a, 105b, and 105c) and a mobile communication network 101. The computing devices 103a, 103b, and 103e (collectively referred to as computing devices) are examples of devices (e.g., mobile or stationary) that may be used for receiving information from the security badges 105a, 105b, or 105e (collectively referred to as security badges) through various means of communication through a transducer. For example, Bluetooth (BT), Radio Frequency Identification (RFID), bar code, WiFi, and Near Field Communication (NFC) can be used as a means of communication between a security badge 105a and a computing device 103a. For simplicity the examples herein assume NFC communication, while it will be understood that other means of communication such as BT, WiFi, and RFID can be used as well. NFC is a set of standards for Smartphone and similar devices, such as the computing devices (e.g. 103a to 103c) discussed herein, to establish radio communication with each other by coming in close proximity (e.g., a few centimeters). Due to its short range and support for encryption, NFC communication is suitable for secure communication over short distances. NFC technology can be included in computing devices 103a to 103c as well as security badges 105a to 105c. Security badges 105a to 105e may be powered (e.g., similar to a computing devices 103a to 103e) or unpowered (e.g., the security badge 105a has a "tag" chip). Computing devices 103a to 103c can take the form of portable handsets including feature phones, smart phones, advanced phones, tablet computers, and mobile computers that can access the network 101. In some examples discussed herein, computing devices are embedded in different parts of a vehicle or at an entrance of a house/building.

As noted above, while the examples that follow are based on NFC communication between computing devices and the authentication server, it will be understood that WiFi communication is possible as well. For example, a virtual private network (VPN) may be used to interconnect the remote mobile devices through primarily public communication infrastructures such as the Internet 23. In one example, VPNs provide security through tunneling protocols and security procedures such as encryption. Thus, VPN could be used to provide secure communication between a computing device (e.g., 103a) and the authentication server 33.

The network 101 provides similar communications for many other similar users as well as for mobile devices/users that do not participate in NFC-based services (e.g., regular mobile devices such as cell phones, tablet computers, etc. that do not include an NFC chip set). Thus, network 101 may provide regular voice and data cellular services. The network 101 provides wireless communications services to the computing devices and other mobile devices (not shown), for example, via a number of base stations (BSs) 17. The present techniques may be implemented in any of a variety of available mobile networks 101 and/or on any type of computing device compatible with such a network 101, and the drawing shows only a very simplified example of a few relevant elements of the network 101 for purposes of discussion here.

The mobile network 101 may be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Long Term Evolution (LTE) standard, or other standards used for public mobile wireless communications. In one example, the computing devices 103a to 103c are capable of voice telephone communications through the network 101, and for receiving information (e.g., through NFC-based communication) from security badges 105. The computing devices 103a to 103c are capable of data communications through the particular type of network 101, and the users thereof typically will have subscribed to data service through the network.

The network 101 allows users of the computing devices such as 103a to 103c (and other computing devices not shown) to request and receive security confirmation information from an authentication server 33 that provides personnel identification information to the computing devices 103a to 103c. The network 101 typically offers a variety of data services via the Internet 23, such as downloads, web browsing, email, messaging, etc. By way of example, the drawing shows a laptop PC type user terminal 27 as well as a server 25 connected to the Internet 23; and the data services for the computing devices 103a to 103c via the Internet 23 may be with devices like those shown at 25 and 27 as well as with a variety of other types of devices or systems capable of data communications through various interconnected networks.

The mobile communication network 101 can be implemented by a number of interconnected networks. Hence, the overall network 101 may include a number of radio access networks (RANs), as well as regional ground networks interconnecting a number of RANs and a wide area network (WAN) interconnecting the regional ground networks to core network elements. A regional portion of the network 10, such as that serving computing devices 103, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the computing devices 103, when the computing devices 103a to 103c are within range. Each base station 17 can include a BTS coupled to several antennae mounted on a radio tower within a coverage area often referred to as a "cell." The BIS is the part of the radio network that sends and receives RF signals to/from the computing devices 103a to 103c that are served by the base station 17.

The carrier may also operate a number of systems that provide ancillary functions in support of the communications services and/or application services provided through the system 10, and those elements communicate with other nodes or elements of the system 10 via one or more private IP type packet data networks 29 (sometimes referred to as an Intranet), i.e., a private network. Generally, such systems are part of or connected for communication via the private network 29. It will be understood that systems outside of the private network could serve the same functions as well. Examples of such systems, in this case operated by the network service provider as part of the overall system 10, which communicate through the intranet type network 29, include one or more authentication servers 33 and one or more replication authentication servers 31. For example, replication servers 31 may be distributed in different regions of the country (e.g., East, Central, and West) to reduce latency in communication with a computing device and to provide additional security through redundancy. Each authentication server 33/31 includes a service personnel database that has stored therein identity information associated with each security badge. For example, the authentication server 33 may include the picture information, ID number, name of the security badge holder, shift hours, and regions where the badge holder is allowed to service. If a security badge is reported stolen, it is recorded in an authentication server 33/31 as well. The information in each authentication server 33/31 is regularly updated.

In one example, system 10 includes a security badge controller server 28. Server 28 provides a digital signature for each security badge 105a to 105c, as discussed in more detail later.

In one example, program applications, including an application to assist in receiving identity information from the security badges 105a to 105c through NFC can be configured to execute on many different types of computing devices 103a to 103c. For example, a computing device application can be written to execute on a binary runtime environment for mobile (BREW-based) mobile station, a Windows Mobile based mobile station, Android, Apple iOS devices (I-Phone or iPad), Java Mobile, or RIM based mobile station such as a BlackBerry or the like. Some of these types of devices can employ a multi-tasking operating system.

Figure 2A:
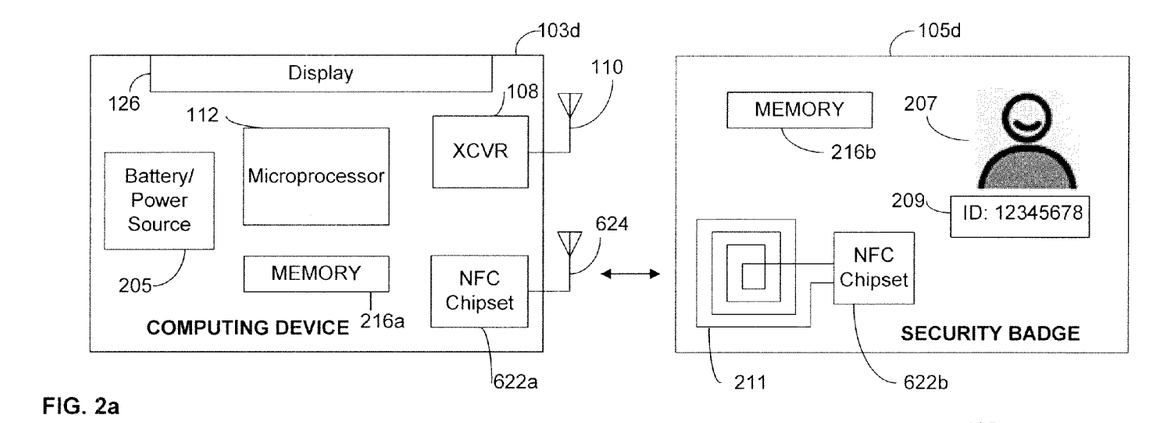
FIG. 2a illustrates an exemplary computing device in communication with a passive security badge.

FIG. 2a illustrates an exemplary computing device 103d in communication with a passive security badge 105d. The simplified block diagram of the computing device 103d includes a display 126, a battery/power source 205, a microprocessor 112, a memory 216a, a transceiver 108 that is capable to communicate with an authentication server through a mobile communication network via antenna 110, and an NFC chipset capable of communicating with a security badge (e.g., 105d) that is NFC compatible via antenna 624. The components of a computing device are discussed in more detail later. In the example of FIG. 2a, computing device 103d communicates with security badge 105d to receive identity information therefrom through NFC. NFC generally involves an initiator and a target. For example, a computing device 103d (e.g., an initiator in this example) may generate an RF field via its inductive antenna 624 that can provide power to the passive target (i.e., security badge 105d) through antenna 211. The security badge 105d is passive and therefore does not need an internal battery or power source to provide power to the NFC chipset 622b. The antenna 211 generates an electronic voltage to supply power to the security badge 105d. The badge 105d in turn provides its identification information via its antenna 211 to the computing device 103d. Since the security badge 105d does not require an internal battery or power source, the security badge 105d can take simple form factors (e.g., a card).

Figure 2B:
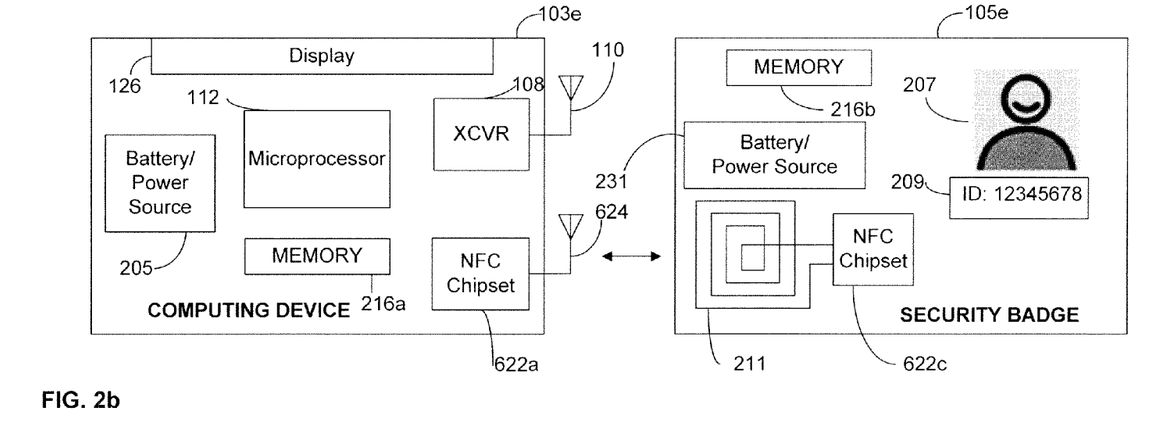
FIG. 2b illustrates an exemplary computing device in communication with an active security badge.

FIG. 2b illustrates an exemplary computing device 103e in communication with an active security badge 105d. For example, both the security badge 105e and the computing device 103d include a battery/power source, 205 and 231 respectively. In this regard, NFC peer-to-peer communication is possible between the computing device 103e and the security badge 105e and either device (e.g., security badge 105e or the computing device 103e) can be an initiator. Indeed, in one example, the security badge 105e is a computing device itself.

Figure 2C:
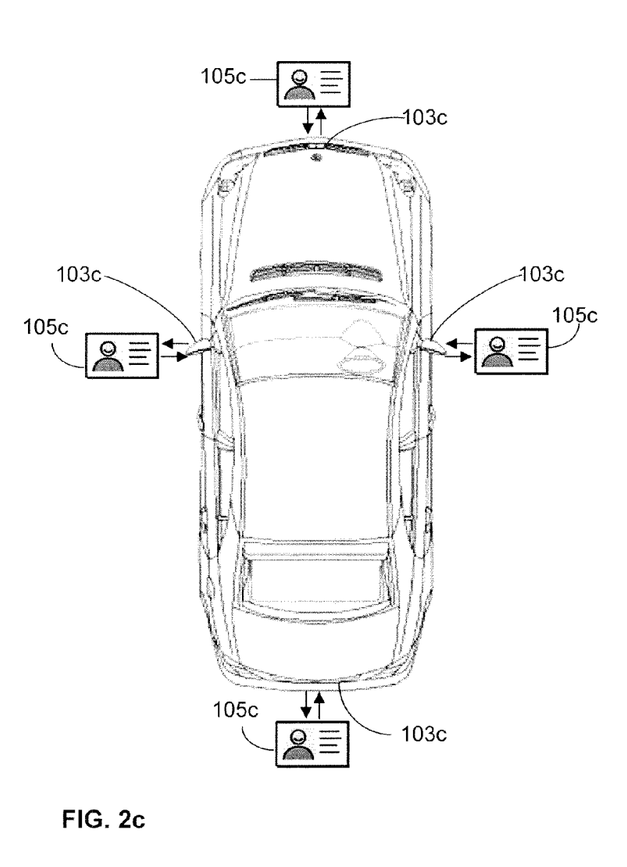
FIG. 2c illustrates an exemplary computing device embedded in a vehicle that is in communication with a security badge.

FIG. 2c illustrates an exemplary computing device 103c embedded in a vehicle that is in communication with a security badge 105c. The identification information is received from the security badge 105c in a number of ways. In one example, an officer may place their security badge 105a in close proximity (e.g., within 4 cm) of a predetermined location on a vehicle (e.g. just stopped by the officer). The predetermined location has embedded therein a computing device 103c that is NFC compatible. For example, the predetermined location may be the front/rear license plate area (e.g., embedded in the license plate or a holder/boarder around the plate) or the left/right side mirror of the vehicle. Thus, the vehicle itself may be equipped with NFC technology and have access to the mobile communication network 101 to communicate with the authentication server 33/31. In one example, notification is provided to the computing device that the confirmation is in progress. The notification that confirmation is in progress and the subsequent authentication information may be displayed on a user interface element such as a display unit (e.g., Global Positioning System (GPS) unit or any other interactive screen) of the vehicle. Thus, although the computing device 103c is embedded in a predetermined location of the vehicle, the associated display unit of the computing device may be separate (e.g., at the console unit inside the vehicle).

Figure 2D:
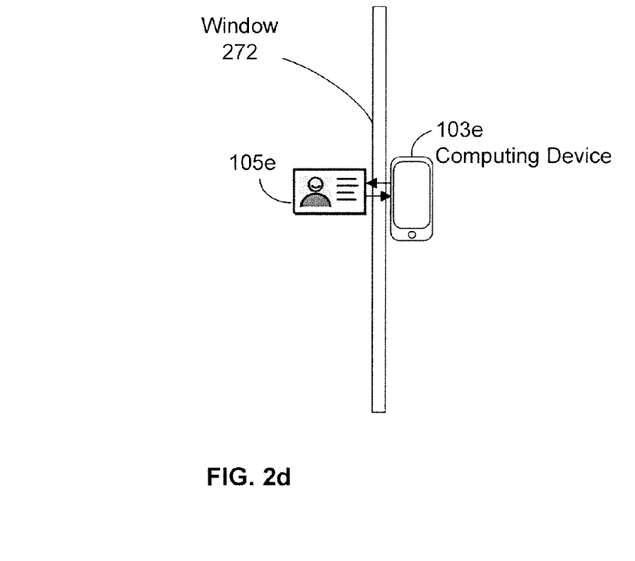
FIG. 2d illustrates an exemplary computing device in communication with a security badge.

In the example of FIG. 2d, the computing device is a handheld device that is configured to receive identity information from the security badge 105e. For example, the officer may realize that the vehicle is not NFC enabled. The vehicle may not have an emblem or light that signifies that it is NFC enabled. In another example, the officer may not receive a confirmation message on the security badge (e.g., in the form of a sound, vibration, message, etc.) that the NFC communication was successful. In this regard, the officer may place their security badge 105e on (or near) a window 272 of the vehicle, while an occupant of the vehicle (e.g., the driver) places their computing device 103e in close proximity (e.g., 4 cm) to the security badge 105e. The window may be open or closed (for more security). The computing device 103e can then use the mobile communication network 101 to send a request including the identity information of the security badge 105e to confirm the identity information with the authentication server 33. In one embodiment, the computing device 103e adds GPS and/or time information to the request and sends the identity information to the authentication server over the mobile communication network 101 for confirmation as well as sending the GPS and/or time information. The identity information and GPS and/or time information may be sent in a single transmission or in a predetermined order in separate transmissions. The additional GPS and/or time information allows the authentication server 33 to determine whether or not the holder of the security badge 105e is on duty during this time and is assigned to patrol the area, respectively. As discussed above, the authentication server 33 may include information related to shift hours and regions where the badge holder is allowed to service based on their assigned service area and schedule. The information in each authentication server 33 is regularly updated.

Figure 2E:
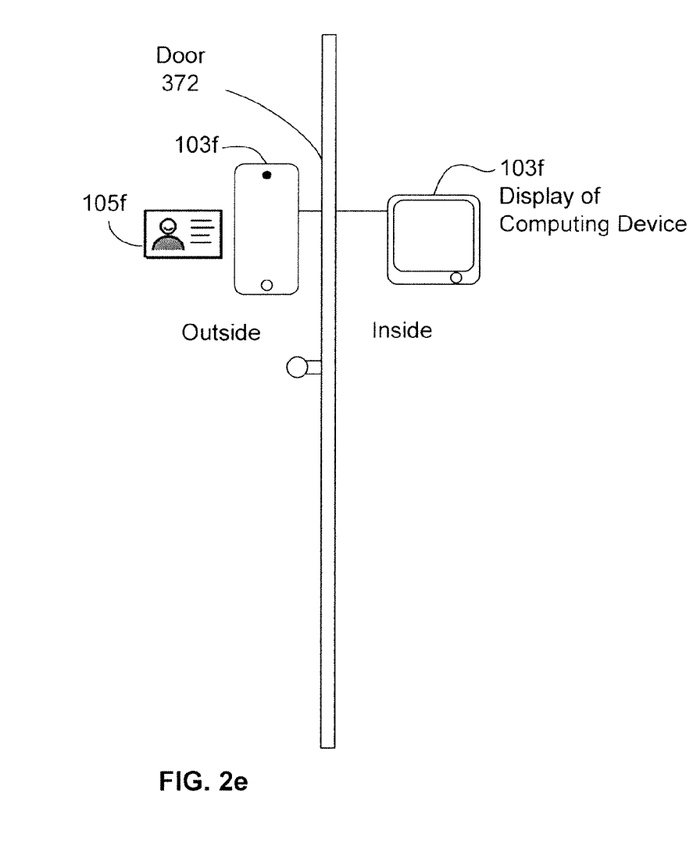
FIG. 2e illustrates a security badge outside an entrance to a building communicating with a computing device.

In various embodiments, service personnel (e.g., a technician) can be authenticated in a similar way. In this regard, FIG. 2e illustrates a security badge 105f outside an entrance to a building communicating with a computing device 103f inside the building through a door 372. For example, a technician may place their security badge 105f in close proximity (e.g., within 4 cm) of a predetermined location on a door at an entrance of a building. This predetermined location has embedded therein a computing device 103f that is NFC compatible. For example, the predetermined location may be the door-bell/intercom that is equipped with NFC technology and has access to the mobile communication network 101 to communicate with the authentication server 33. The authentication information may be displayed on a display unit 103f inside the house (e.g., display in front of the entrance).

Figure 2F:
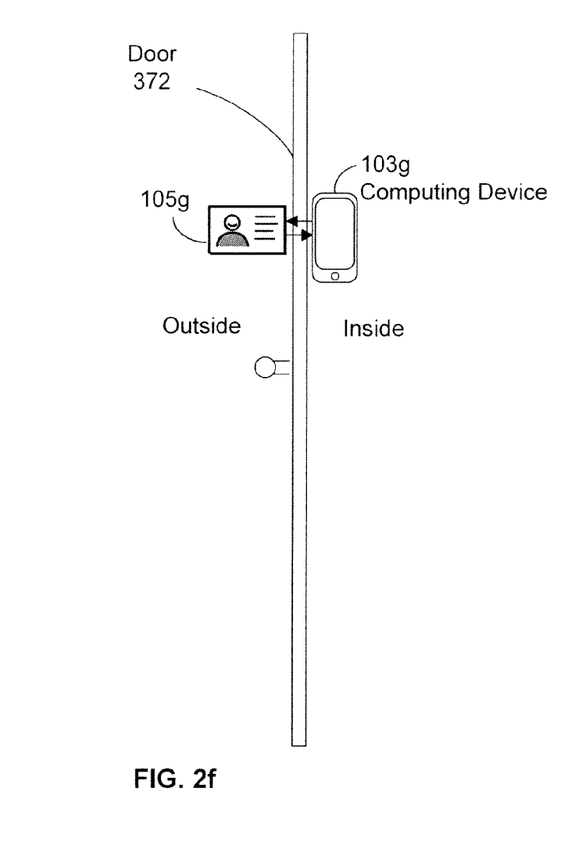
FIG. 2f illustrates a security badge outside an entrance to a building communicating with a computing device inside the building through a door.

If the front entrance is not equipped with such a computing device, the technician may place their security badge 105g at a predetermined location on the door, while the client inside the house places their handheld computing device 103g at the same predetermined location on the door, inside the house, as illustrated in FIG. 2f. The computing device 103g can then use the mobile communication network 101 to send the identity information of the security badge 105g to the authentication server 33 for confirmation.

Referring back to FIG. 1, upon receiving the identity information from the security badge 105a, computing device 103a communicates over the air with a base station 17 and through the communication network 101 with authentication server 33. Accordingly, the identity information obtained from the security badge 105a is provided to the authentication server 33. The identification information obtained from the security badge 105a may include picture information, ID number, and name of the security badge holder. In one example, the computing device includes time and/or GPS information in its request to the authentication server 33.

Based on the information received by the authentication server 33 from the communication device 103a, the authentication server 33 determines whether service personnel (e.g., officer, technician, etc.) is valid, at the correct location, and at the correct time (e.g., when time and GPS information is provided by the computing device 103a). The authentication server 33 in turn compares the information to information stored in a service personnel database in at least one storage device associated with the authentication server 33. For example, the identification number is compared to existing personnel, as well as service information, such as shift times of the personnel and whether an appointment has been scheduled at the particular address/location (e.g., GPS location). Thus, the authentication server 33 determines whether there is any security concern with the identification information by comparing the identification information to stored service personnel information in the service personnel database. Security concerns may include any one or combination of the following: (i) the security badge is not authentic based on the identification number or other identification (such as a bar code or Quick Response (QR) code); (ii) the security badge is reported stolen; (iii) the owner of the security badge is not authorized to be at the location; and/or the owner of the security badge is not authorized to work at this time period.

The result is sent as a response to the computing device 103a making the inquiry (e.g., the client). In one example, a visual image of the service personnel may be displayed on the computing device or a green light, indicating that the identification information is confirmed (e.g., there are no security concerns). In one embodiment, the computing device receives identification information (e.g., how many fingers the security personnel is to display) while the security badge 105a (which may be a handheld computing device) receives instructions from the authentication server 33 to display the identification information (e.g., the number of fingers to display to the client).

In one example, the authentication server 33 may refer to a third party server (not shown) to request authentication information therefrom. For example, service personnel information for police officers may be in a separate third party server administered by the police. When an authentication request is received by the authentication server 33 from a computing device (e.g., 103a), the request may be redirected to the third party server. In this regard, the third party server provides determines whether there is any security concern with the identification information by comparing the identification information to stored service personnel information in a service personnel database of the third party server. A visual image of the officer may be sent by the third party server, either directly to the computing device 103a, or indirectly through the authentication server 33. In one example, the computing device 103a submits an identification verification request directly to the third party server. In another example, the third party server sends to the computing device 103a a message that includes a link to a web-site that includes picture information of the service personnel.

In one example, the notification is sent to the computing device 103a (and/or to the security badge 105a) via Internet Protocol Multimedia Subsystem (IMS), Short Message Service (SMS), and/or Multimedia Messaging Service (MMS). The information sent may be encrypted for added security (e.g., using public-key infrastructure (PKI) encryption, SSL).

The authentication server 33 may determine the validity of the identification information in various ways. For example, the authentication server 33 compares the received identification information with a pre-configured database including personnel information. If there is no correlation with the pre-existing database, the security badge 105a is deemed a fake. In one example, the security badge may be legitimate but not authorized or scheduled to be at the location and/or to work at that time. Further, the badge may be registered in the pre-configured service personnel database of the authentication server 33 as stolen. The authentication server 33 may respond differently in each situation. For example, if the badge is identified as stolen or fake, the authentication server 33 may send a message to the computing device 103a to display an alert in red (e.g., "stolen ID" or "fake ID"). In one example, the computing device 103a is prompted the user of the computing device 103a with a one button option of dialing an emergency service (such as 911). In another example, the authentication server 33 sends a message to the computing device 103a that includes an instruction to a program on the computing device that automatically dials an emergency service (e.g., 911), while displaying an alert in red. In another example, the authentication server 33 uses the mobile communication network 101 to dial the emergency service with a code for an ongoing situation (e.g. determined type of security concern) and include information about the situation (e.g., UPS location as determined from the computing device 103a and/or the authentication server 33, time, failure to authenticate a security badge, etc.).

In another embodiment, as a failsafe (e.g., when network access is not available), predetermined information related to verification can be stored in a computing device 103a for a predetermined length of time (e.g., updated daily) and used in the event of network unavailability (or may be used as a supplemental method of verification if the network is available). For example, a utility company schedules an appointment for a meter reading. In this regard, the authentication server 33 encrypts service personnel identification data such as Badge #, Badge Name, Digital face image, truck #, Truck Color, etc., using Public Key Infrastructure (PKI) private key hashes or creates a pre-shared one way hash to encrypt the data (such as NFC data written to NFC ID at registration time). If applicable, the data and pre shared key are sent over the mobile communication network 101 to the computing device 103a. For example, the contact information of the computing device 103a is maintained in a customer database, which may be part of authentication server 33 or in a separate server (not shown). A hash is any algorithm or subroutine that maps large data sets of variable length, called keys, to smaller data sets of a fixed length. For example, the name of the service personnel, the security badge number, NFC ID of the security badge, and the picture information of the security badge owner could be hashed to a single integer. The values returned by a hash function are called hash values, hash codes, hash sums, checksums or simply hashes When the service personnel arrives, the computing device 103a (that has previously received the pre-shared hash key and PKI public keys) is able to receive the identification information from the security badge 105a, decrypt it with the pre-shared hash key or PKI public key, and authenticate the security badge 105a without having to rely on the mobile communication network 101 at the time of the interaction with the service personnel. For example, the handheld device indicates a green authentication signal and illustrates a picture of the service personnel associated with the security badge 105a. Thus, even when the mobile communication network is down (e.g., unavailable for any reason), the service personnel can be successfully authenticated.

Figure 3:
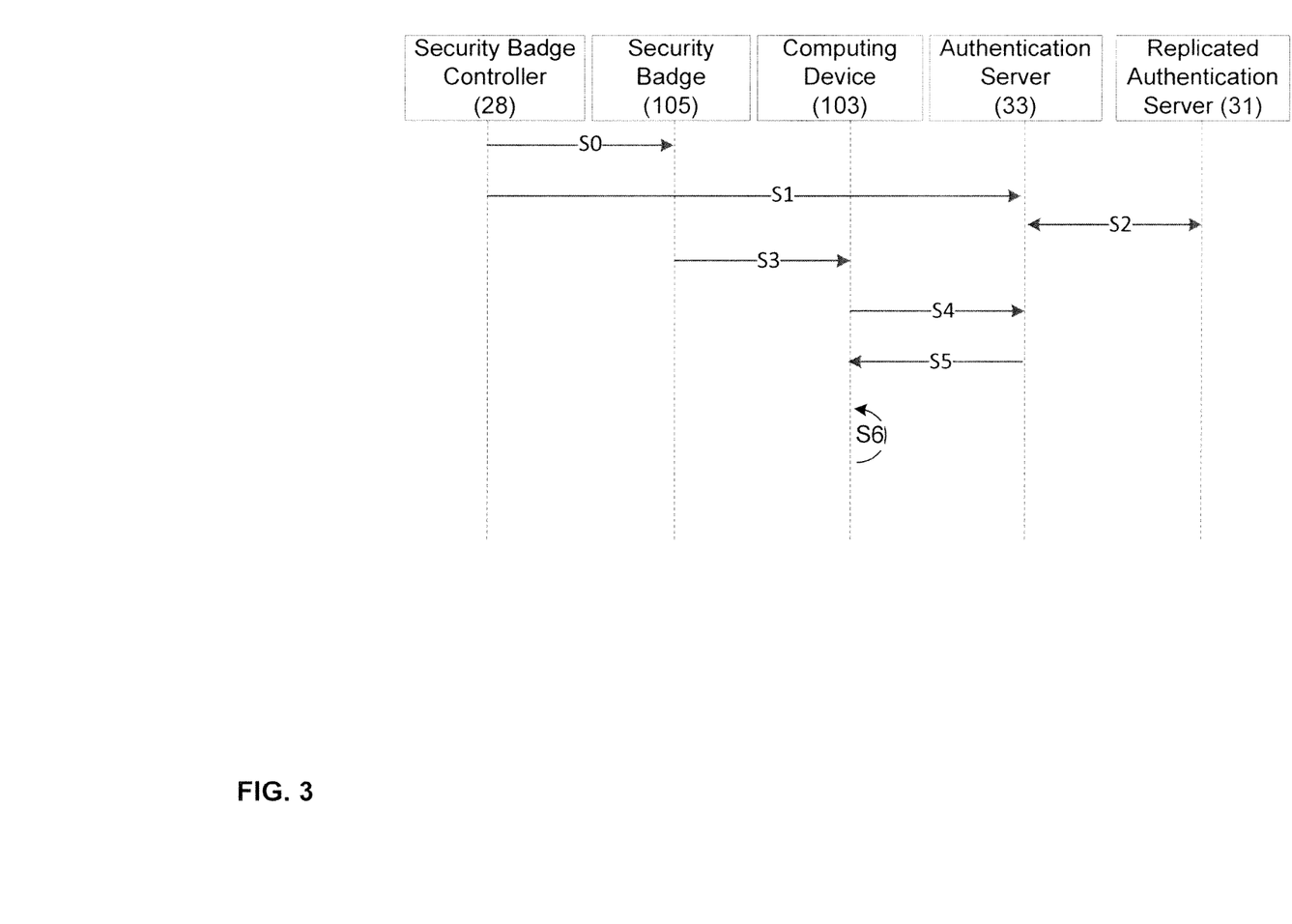
FIG. 3 illustrates an exemplary signaling flow between a security badge, a computing device, and an authentication server.

With the foregoing overview of the system, it may be helpful now to consider a high-level example of an authentication of service personnel having a security badge, over a mobile communication network. FIG. 3 illustrates an exemplary call flow between a security badge controller 28, a security badge 105, a computing device 103, an authentication server 33, and a replicated authentication server 31. In this example, a user of the computing device 103a attempts to authenticate the legitimacy of the holder of the security badge 105. It is assumed that NFC communication is used between the security badge 105a and the computing device 103a, although other types of communication can be used, as discussed above.

In the setup stage (i.e., step 0), a security badge controller 28 encrypts a random string to create a digital signature. This digital signature is assigned to a register of the security badge. The security badge controller 28 uses its own private key to store it on a memory of the security badge 105a. The security badge controller 28 queries a predefined set of domain name server (DNS) addresses for the authentication servers (e.g., 33/31). For example, internet protocol version 4 (IPv4) or Internet Protocol version 6 (IPv6) can be used.

In step 1, the security badge controller 28 registers the security badge 105a with the authentication server 33 using the DNS. In one example, the registration of step 1 includes the public key to decrypt the digital signature. The digital signatures may be replicated across different authentication servers (e.g., 33/31) distributed in different regions (e.g., West, Central, East, etc.) for faster response time (i.e., step 2).

Service personnel associated with the security badge 105a may now be authenticated. For example, in step 3, the security badge 105a is brought to close proximity (e.g., within 4 cm) to a computing device 103a that has NFC reading capability. As discussed above, the computing device may be a handheld device, be embedded in different locations in a vehicle, or be at an entrance of a home, as discussed above. The computing device acquires the location of the authentication server (33/31) based on the DNS (e.g., IPv4 or IPv6).

In step 4, the computing device 103a transfers the encrypted digital signature information to the authentication server (33/31) via the mobile communication network. As alluded to above, although FIG. 3 shows the computing device 103a transferring the information to authentication server 33, the computing device 103a may instead transfer the information to replicated authentication server 31. In one example, the authentication server (33/31) is connected to the mobile communication network via a secured channel, such as a virtual private network (VPN). The authentication server (33/31) uses the encrypted string in the certification request as a hash into its one or more internal databases and uses the public key registered there during setup to decrypt the information related to the security badge 105a being authenticated.

In step 5, the authentication server (33/31) determines whether there is any security concern with the identification information obtained via the computing device 103a from the security badge 105a, by comparing the identification information to stored service personnel information in the service personnel database. Subsequently, a response is sent through the mobile communication network to the computing device 103a.

In step 6, the result of the determination of step 5 is displayed on a user interface (e.g. screen) of the computing device. For example, a visual image of the service personnel may be displayed on the computing device 103a with a green frame, indicating that the identification information is confirmed and no security issues have been identified. In other embodiments, email or text messages (or automated phone messages) may be used to verify or alert the user of the computing device 103a as to the determination.

Figure 4:
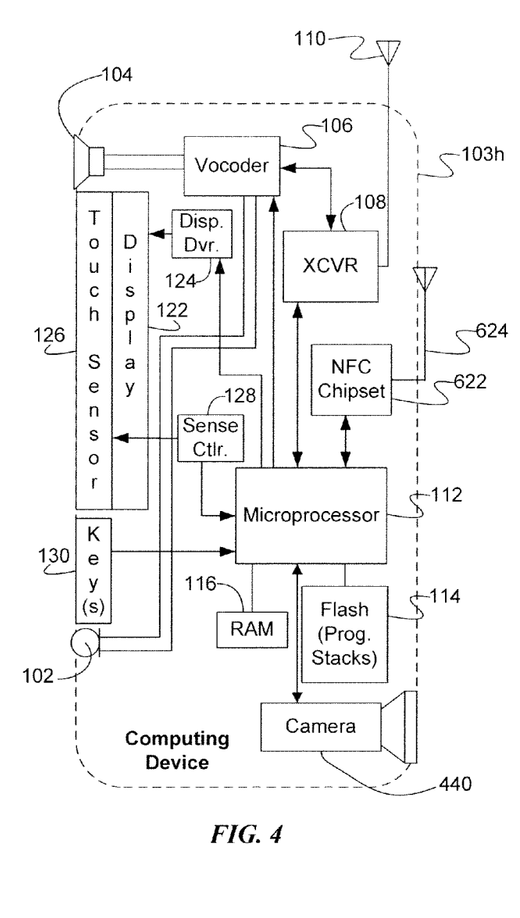
FIG. 4 illustrates a high level simplified function block diagram of an exemplary computing device.

As shown by the discussion of the method of FIG. 1, the authentication of service personnel involves an interaction with an appropriately configured computing device 103h. A computing device may be mobile or stationary. In this regard, it may be useful to consider the functional elements/aspects of an exemplary computing device, at a high-level. For purposes of such a discussion, FIG. 4 provides a block diagram illustration of an exemplary computing device 103h. Although the computing device 103h may be a handset type mobile phone or may be incorporated into another device, such as a personal digital assistant (PDA), a tablet computer, a vehicle, or advanced intercom/doorbell or the like. For discussion purposes, the illustration shows the computing device 103h in the form of a handheld smart-phone. The smart-phone embodiment of the computing device 103h may function as a normal digital wireless telephone station. For that function, the computing device 103h includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications through mobile communication network 101 and possibly voice over packet (Internet Protocol) communications if supported by the computing device 103h and the data services through the mobile communication network 101.

For digital wireless communications, the computing device 103h also includes at least one digital transceiver (XCVR) 108. The transceiver (XCVR) 108 could be a multimode transceiver, or the mobile computing device 103d may include two or more transceivers each of which supports a subset of the various technologies or modes. The concepts discussed here encompass embodiments of the mobile computing device 103d utilizing any digital transceivers that conform to current or future developed digital wireless communication standards.

The transceiver 108 provides two-way wireless communication of information, such as vocoded speech samples and/or digital message information, in accordance with the technology of the network 10. The transceiver 108 also sends and receives a variety of signaling messages in support of the various voice and data services provided via the computing device 103h and the communication network, in this case. Each transceiver 108 connects through RF send and receive amplifiers (not separately shown) to an antenna 110. In the example, the transceiver 108 is configured for RF communication in accord with a digital wireless protocol, such as the current CDMA and 3GPP protocols.

The computing device 103h includes a display 122 for displaying messages, menus or the like, call related information dialed by the user, calling party numbers, etc. The computing device 103h also includes a touch/position sensor 126. The sensor 126 is relatively transparent, so that the user may view the information presented on the user interface (i.e., display) 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the computing device 103h. The microphone 102 and speaker 104 may be used as additional user interface elements, for audio input and output. Of course, other user interface elements may be used, such as a trackball, as in some types of smart phones or tablets.

In one example, the computing device 103h also includes a digital camera 440, for capturing still images and/or video clips. Although digital camera 440 is shown as an integrated camera of mobile device 400, it should be noted that digital camera 440 may be implemented using an external camera device communicatively coupled to mobile device 400. The user may, for example, operate one or more keys 130 or provide input via touch sensor 126 to take a still image of the security badge, bar code, or text on the security badge, which essentially activates the camera 440 to create a digital representation of an optical image visible to the image sensor through the lens of the camera. The camera 440 supplies the digital representation of the image to the microprocessor 112, which stores the representation as an image file in one of the device memories.

Computing device 103h may also include a haptic element (not shown) to provide haptic feedback to the user. Various combinations of the keypad 120, display 122, microphone 102, haptic element, and speaker 104 may be used as the physical input output elements of the graphical user interface (GUI), for multimedia (e.g., audio and/or video) communications. Of course other user interface elements may be used, such as a stylus and touch sensitive display screen, as in a PDA, tablet computer, or smart phone. In addition to normal telephone and data communication related input/output (including message input and message display functions), the user interface elements also may be used for display of menus and other information to the user and user input of selections, for example, including any needed to provide authentication information or related warnings if an authentication of a security badge fails.

The computing device 103h also includes a transducer 622. For example, the transducer 622 may comprise a near field communication (NFC) chipset, which includes an NFC transceiver. In this example, the NFC chipset 622 provides two-way wireless communication of information in accordance with NFC technology and protocols. The NFC chipset 622 also sends and receives a variety of signaling messages for establishing NFC links with other NFC-enabled devices. The NFC chipset 622 is connected to a NFC antenna 624, which is used for transmitting and receiving NFC communications to/from other mobile stations.

In the example, a microprocessor 112 serves as a programmable controller or processor for the computing device 103, in that it controls all operations of the computing device 103h in accord with programming that it executes, for all normal operations, and for operations involved in processing the received security badge information and the received authentication from the authentication server under consideration here. In the example, the computing device 103h includes flash type program memory 114, for storage of various "software" or "firmware" program routines and mobile configuration settings, such as mobile telephone number (MTN or MDN), etc. The computing device 103h may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile computing device 103h includes a processor, and programming stored in the flash memory 114 configures the processor so that the mobile station is capable of performing various desired functions, including receiving security badge information, communicating the security badge information to an authentication server, receiving authentication information from the authentication server, receiving a preauthorization information from an authentication server, decrypting identification information from a security badge, and determining whether there is a security concern with the security badge.

As discussed above, functions relating to authenticating security badge information may be implemented on one or more computers connected for data communication via the components of a packet data network, including computing devices 103, in accordance with the methodology of FIGS. 1 and 2. An exemplary computing device 103h has been discussed above with respect to FIG. 4. Although special purpose devices may be used as the server(s), for example for any of the servers 28 to 33 in FIG. 1, such devices also may be implemented using one or more hardware platforms intended to represent a general class of data processing device commonly used to run "server" programming so as to implement the functions discussed above, albeit with an appropriate network connection for data communication.

Figures 5, 6:
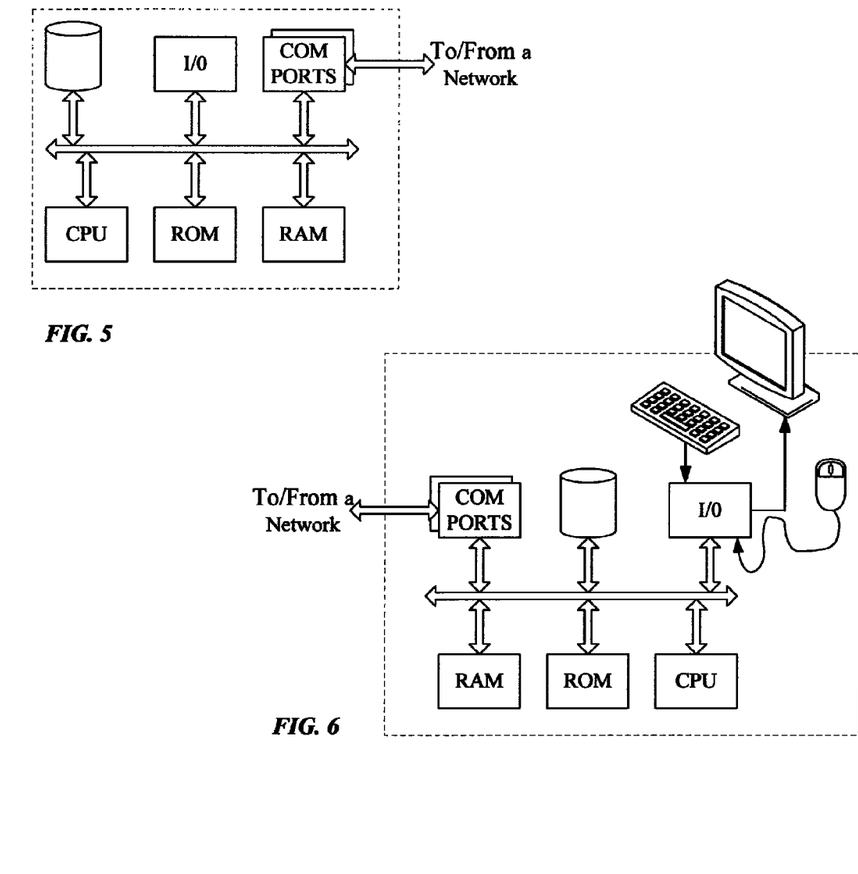
FIG. 5 illustrates a network or host computer.
FIG. 6 depicts a computer with user interface elements.

FIGS. 5 and 6 provide functional block diagram illustrations of general purpose computer hardware platforms, as might be used as an authentication server or other computers discussed in the examples above. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the methods of receiving and authenticating security badge information, as outlined above, may be embodied in programming for a server and programming for a computing device. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3GPP2: 3'rd Generation Partnership Project 2
BREW: Binary Runtime Environment for Mobile
BS: Base Station
BT: Bluetooth
BTS: Base Transceiver System
CDMA: Code Division Multiple Access
CPU: Central Processing Unit
EVDO: Evolution Data Optimized
GPS: Global Positioning System
GSM: Global System for Mobile
GUI: Graphical User Interface
IMS: Internet Protocol Multimedia Subsystem
ID: Identification
IPv4: Internet Protocol version 4 (IPv4)
IPv6: Internet Protocol version 6 (IPv6)
IT: Information Technology
LTE: Long Term Evaluation
MDN: Mobile Directory Number
MIN: Mobile Identification Number
MMS: Multimedia Messaging Service
MTN: Mobile Telephone Number
NFC: Near Field Communication
PDA: Personal Digital Assistant
PDN: Packet Data Network
PKI: Public-Key Infrastructure
PSTN: Public Switched Telephone Network
QR: Quick Response
RAM: Random Access Memory
RAN: Radio Access Network
RF: Radio Frequency
RFID: Radio Frequency Identification
SMS: Short Message Service
TDMA: Time Division Multiple Access
VPN: Virtual Private Network
WAN: Wide Area Network
XCVR: Transceiver

What is claimed is:

1. A computer comprising:
a data network communication interface;
a central processing unit coupled to the interface;
at least one storage device accessible to the central processing unit;
a service personnel database in the at least one storage device storing service personnel information including identification information of existing service personnel and service information, wherein the service information includes at least one of shift information for the existing service personnel and global positioning system location of scheduled appointments; and programming in the at least one storage device, wherein execution of the programming by the central processing unit configures the computer as a server to perform functions, including functions to:
receive a service personnel identification verification request from a computing device via the interface, the request including identification information obtained via the computing device from a security badge, and global positioning system information and time information determined by the computing device;
determine a security concern with the identification information obtained from the security badge, by comparing the identification information obtained from the security badge and global positioning system information and time information obtained from the computing device to service personnel information and scheduled appointments in the service personnel database;
(c) based upon the determination that a security concern exists, send a response through the interface for communication to the computing device providing a result of the determination;
automatically contact an emergency service; and
provide the location coordinates obtained from the computing device to the emergency service; or provide a security concern code indicating a determined type of security concern to the emergency service.

2. The computer of claim 1, wherein the identification information includes a picture, name and/or identification number of an owner of the security badge.

3. The computer of claim 1, wherein the security concern includes at least one of the following:
the security badge is not authentic based on identification number on the security badge;
the security badge has been reported stolen;
an owner of the security badge is not authorized to be at a location indicated by the location coordinates; or
the owner of the security badge is not authorized to work at a time indicated by the time information.

4. The computer of claim 1, wherein the response includes a notification configured to be displayed on a graphical interface associated with the computing device.

5. The computer of claim 4, wherein the notification includes a picture of the owner of the security badge and a message on whether or not the security concern has been identified.

6. The computer of claim 4, wherein when a security concern is determined, the notification includes a single button direct dial option to an emergency service for user activation at the computing device.

7. The computer of claim 4, wherein when a security concern is determined, the notification includes a trigger that causes the central processing unit to automatically dial the emergency service from the computing device.

8. A computing device, comprising:
a wireless transceiver configured for wireless data communication via a mobile communication network;
a transducer;
a user interface element;
a controller coupled to the transceiver, the transducer and the user interface element, wherein the controller is configured to control operations of the computing device to implement functions including functions to:
electronically obtain identification information from a security badge via the transducer;
transmit a personnel identification verification request via the transceiver through the mobile communication network to an authentication server, the request including the identification information obtained from the security badge;
receive a response from the authentication server through the mobile communication network via the wireless transceiver;
based on the response, present via the user interface element of the computing device an indication that there is a security concern with the identification information obtained from the security badge;
automatically contact an emergency service; and
provide the location coordinates obtained from the computing device to the emergency service; or
provide a security concern code indicating a determined type of security concern to the emergency service,
wherein at least a portion of the computing device is embedded in a mirror and/or a license plate area of a vehicle.

9. The computing device of claim 8, wherein the identification information includes a picture, name and/or identification number of an owner of the security badge.

10. The computing device of claim 8, wherein the personnel identification verification request further includes location coordinates and/or time information determined by the computing device.

11. The computing device of claim 10, wherein the security concern includes at least one of the following:
the security badge is not authentic based on identification number on the security badge;
the security badge has been reported stolen;
an owner of the security badge is not authorized to be at a location; and
the owner of the security badge is not authorized to work at a time indicated by the time information.

12. The computing device of claim 8, wherein the response includes a picture of the owner of the security badge.

13. The computing device of claim 8, wherein the controller is further configured to implement functions, in response to receiving a response indicating that the security risk exists, to provide a single button direct dial option to an emergency service.

14. The computing device of claim 8, wherein: the transducer comprises an NFC chip set; and the controller is configured to electronically obtain the identification information through NFC communication via the NFC chip set.

15. A computing device, comprising:
a wireless transceiver configured for wireless data communication;
a transducer;
a user interface element;
a controller coupled to the transceiver, the transducer and the user interface element, wherein the controller is configured to control operations of the computing device to implement functions including functions to:
receive a preauthorization message including a hash comprising (i) a first identification information and (ii) decryption code from an authentication server, through the mobile communication network via the wireless transceiver, wherein the hash is valid for a predetermined time period;
electronically obtain second identification information from a security badge via the transducer;
decrypt the second identification information using the decryption code;
determine that there is a security concern with the decrypted second identification information by comparing the decrypted second identification information to the first identification information;
based on the determination that a security concern exists, present via the user interface element an indication of whether or not there is a security concern;
automatically contact an emergency service; and
provide the location coordinates obtained from the computing device to the emergency service; or
provide a security concern code indicating a determined type of security concern to the emergency service.

16. The computer of claim 1, wherein further execution of the programming by the central processing unit configures the computer as a server to perform functions, including functions to:
in response to a subsequent comparison, confirm that the service personnel is valid, at the correct location, and at the correct time.

* * * * *